US012696120B2

(12) United States Patent
Dalsgaard et al.

(10) Patent No.: US 12,696,120 B2
(45) Date of Patent: Jul. 28, 2026

(54) METHOD AND APPARATUS FOR FAST MEASUREMENT REPORTING

(71) Applicant: Nokia Technologies Oy, Espoo (FI)

(72) Inventors: Lars Dalsgaard, Oulu (FI); Faranaz Sabouri-Sichani, Aalborg (DK); Tero Henttonen, Espoo (FI); Ahmed Farhan Hanif, Nozay (FR); Niko Kolehmainen, Espoo (FI); Elena Virtej, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 299 days.

(21) Appl. No.: 18/565,230

(22) PCT Filed: May 26, 2022

(86) PCT No.: PCT/IB2022/054980
§ 371 (c)(1),
(2) Date: Nov. 29, 2023

(87) PCT Pub. No.: WO2022/263956
PCT Pub. Date: Dec. 22, 2022

(65) Prior Publication Data
US 2024/0259852 A1 Aug. 1, 2024

Related U.S. Application Data

(60) Provisional application No. 63/210,396, filed on Jun. 14, 2021.

(51) Int. Cl.
*H04W 24/10* (2009.01)
*H04W 76/10* (2018.01)

(52) U.S. Cl.
CPC ........... *H04W 24/10* (2013.01); *H04W 76/10* (2018.02)

(58) Field of Classification Search
CPC ............................. H04W 76/27; H04B 7/0617
(Continued)

(56) References Cited

U.S. PATENT DOCUMENTS

2011/0267978 A1* 11/2011 Etemad ................. H04L 5/0016
370/254
2018/0368018 A1 12/2018 Kim et al.
(Continued)

FOREIGN PATENT DOCUMENTS

WO 2022/263314 A1 12/2022

OTHER PUBLICATIONS

"3rd Generation Partnership Project; Technical Specification Group Radio Access Network; NR; Requirements for support of radio resource management (Release 17)", 3GPP TS 38.133, V17.1.0, Mar. 2021, 2172 pages.
(Continued)

*Primary Examiner* — Fabricio R Murillo Garcia
(74) *Attorney, Agent, or Firm* — Carter, DeLuca & Farrell LLP

(57) ABSTRACT

In accordance with an example embodiment of the present invention, methods and apparatus for receiving a configuration for fast measurement reporting and determining, while in an idle or inactive mode, an occurrence of a connection setup trigger. When at least one fast measurement reporting carrier is configured, starting measurements on the at least one fast measurement reporting carrier in response to the determination of the occurrence of the connection setup trigger. Performing a connection setup and continuing the measurements during the connection setup.

1 Claim, 4 Drawing Sheets

(58) Field of Classification Search
USPC .......................................................... 455/424
See application file for complete search history.

(56) References Cited

U.S. PATENT DOCUMENTS

| | | | |
|---|---|---|---|
| 2019/0150014 A1 | 5/2019 | Virtej et al. | |
| 2019/0306739 A1 | 10/2019 | Kim et al. | |
| 2020/0367085 A1* | 11/2020 | Hong | H04W 12/50 |
| 2022/0116809 A1* | 4/2022 | Cheng | H04W 56/001 |
| 2022/0132348 A1* | 4/2022 | Orsino | H04W 76/27 |
| 2023/0262501 A1* | 8/2023 | Rugeland | H04W 76/27 |
| | | | 370/252 |

OTHER PUBLICATIONS

"3rd Generation Partnership Project; Technical Specification Group Radio Access Network; Study on channel model for frequencies from 0.5 to 100 GHz (Release 16)", 3GPP TR 38.901, V16.1.0, Dec. 2019, pp. 1-101.

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-145.

"Msc-generator", Sourceforge, Retrieved on Jan. 18, 2024, Webpage available at :https://sourceforge.net/projects/msc-generator/.

"Small Data Transmission Enhancements for Rel-18", RAN Rel-18 Workshop, RWS-210080, Nokia, June 28-Jul. 2, 2021, pp. 1-10.

International Search Report and Written Opinion received for corresponding Patent Cooperation Treaty Application No. PCT/IB2022/054980, dated Sep. 9, 2022, 16 pages.

"New WID on Further NR mobility enhancements", 3GPP TSG RAN Meeting #94e, RP-213565, Agenda: 8A.2, MediaTek, Dec. 6-17, 2021, 5 pages.

* cited by examiner

METHOD AND APPARATUS FOR FAST MEASUREMENT REPORTING

RELATED APPLICATIONS

This application was originally filed as PCT Application No. PCT/IB2022/054980 on May 26, 2022, which claims priority from U.S. Provisional Application No. 63/210,396, filed on Jun. 14, 2021, each of which is incorporated herein by reference in its entirety.

TECHNICAL FIELD

The present application relates generally to fast reporting of current measurement results in wireless systems

BACKGROUND

Wireless systems such as those defined by 3rd Generation Partnership Project (3GPP) in general provide for two ways of provisioning measurement results from user equipment (UE) to a network. In one way, a UE is configured to measure when not in connected mode (e.g. when the UE is in idle mode) and reports measurement result during connection setup, sometimes referred to as early measurement reporting (EMR). In another way, a UE is configured after connection establishment (i.e. when the UE is connected mode) to perform measurement and subsequently report measurement results.

In order to achieve improved transmission ranges, throughput and system capacity, wireless systems may make use of directional antennas and beamforming at both cells and UEs. To facilitate measurements in such systems, a cell may sequentially transmit synchronization signals from a plurality of transmission beams and a UE may sequentially measure from a plurality of reception beams, each commonly referred to as a sweep.

Under the assumption that a UE can only measure one reception beam at a time, the time to measure a sweep may be come significant. For example, from 3GPP New Radio (NR) as specified in 3GPP TS38.133, Table 4.2.2.4-1, it may be concluded that to measure a single inter-frequency carrier at the shortest discontinuous reception (DRX) cycle of 320 ms in FR2 (channels in frequency range 24250 MHz-52600 MHZ), the time to detect and measure cells may be as much as $320 \times (36 \times 8 \times 1.5 + 4 \times 8 \times 1.5) = \sim 2.5$ minutes. Because multiple carriers are typically configured for inter-frequency and inter-radio-access-technology (inter-RAT) measurements, where measurements are generally performed sequentially, the total measurement time may become prohibitive.

Considering in addition that, due to movement and/or environmental changes, channel conditions may change rapidly, especially in FR2, the measurement results reported during connection setup may no longer be a good descriptor of the channel conditions at that time, due to lengthy time since the measurements were performed in idle mode. Such reported measurements may hence be described as stale.

Using the another way, in which a UE first enters connected mode, is then provisioned with measurement configurations after which measurement gaps can be negotiated, significant time is wasted to facilitate the initiation of measurements, after which the measurement duration can still be prohibitive (see e.g. 3GPP TS38.133 at Table 9.3.4-2, Table 9.3.4-4 and Table 9.3.5.2, from which a measurement duration of as much as one minute per inter-frequency carrier may be derived).

Using the one way, a cell may hence end up with stale measurement results resulting in sub-optimum selections for example of carrier aggregation (CA) or Dual Carrier (DC) cells for a UE, where using the another way, a cell may for example end up with significant setup delay for CA or DC, either of which may cause a significant drop in throughput for the UE and significant reduced system capacity.

In contrast, embodiments of the present invention provide for reporting of fast measurement results (FMR) that are current (i.e. not stale) without wasting time to facilitate the initiation of measurements.

SUMMARY

Various aspects of examples of the invention are set out in the claims.

According to a first aspect of the present invention, receive a configuration for fast measurement reporting; determine, while in an idle or inactive mode, an occurrence of a connection setup trigger; and when at least one fast measurement reporting carrier is configured, start measurements on the at least one fast measurement reporting carrier in response to the determination of the occurrence of the connection setup trigger.

According to a second aspect of the present invention, receiving a configuration for fast measurement reporting; determining, while in an idle or inactive mode, an occurrence of a connection setup trigger; and when at least one fast measurement reporting carrier is configured, starting measurements on the at least one fast measurement reporting carrier in response to the determination of the occurrence of the connection setup trigger.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
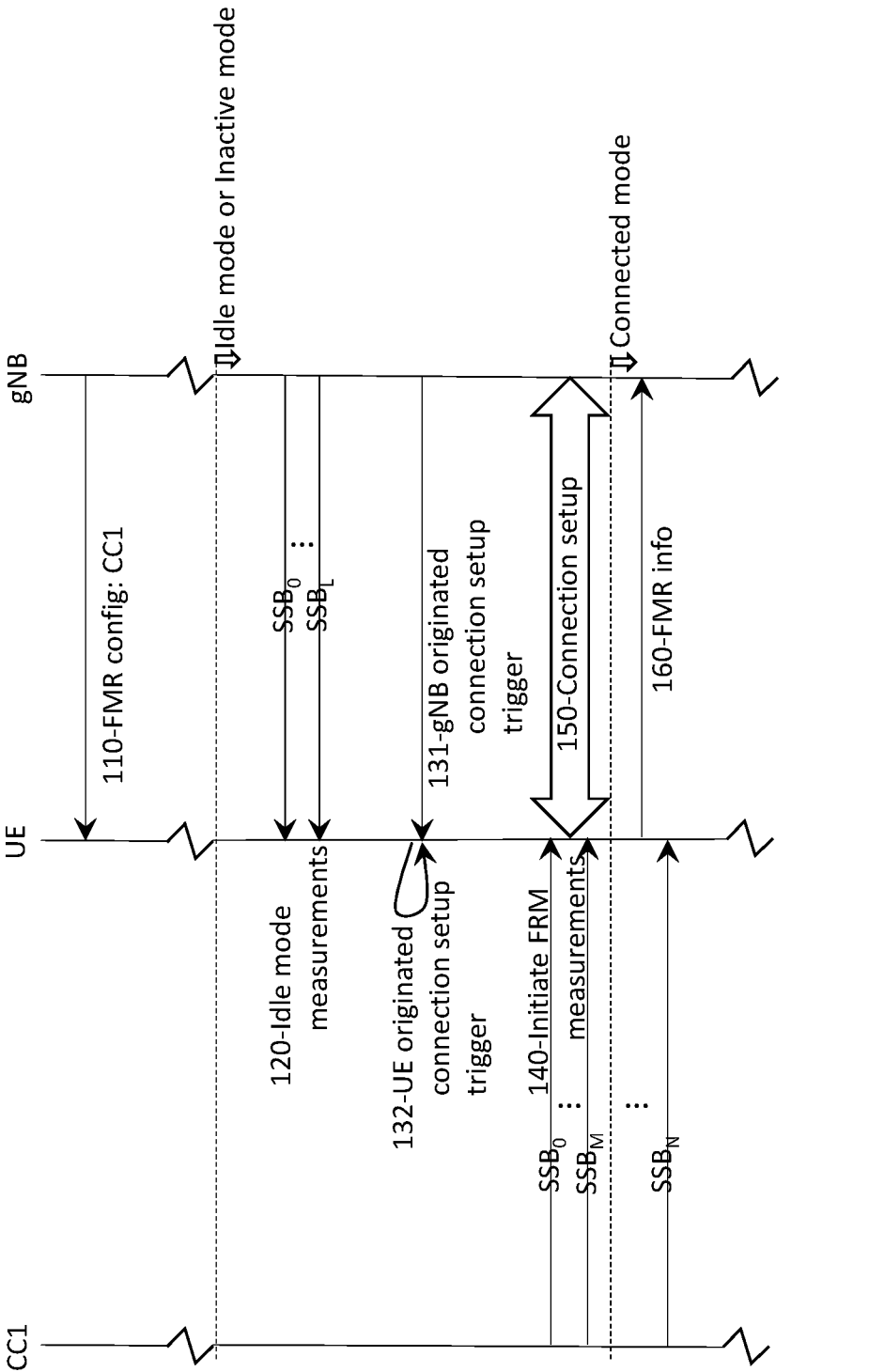
FIG. 1 illustrates an example signal flow of fast measurement configuration, initiation and reporting in accordance with embodiments of the invention.

FIG. 1 illustrates an embodiment of fast measurement, wherein at 110 a UE receives a configuration from a gNB for fast measurement reporting, the configuration indicating at least one carrier subject to fast measurement reporting.

In the below, measurements for fast measurement reporting may also be termed fast measurements for brevity, and a carrier configured to be measured for fast measurement reporting may also be termed a fast measurement carrier.

The indication may comprise for example an indication of a carrier for which the UE has a stored measurement configuration, a measurement configuration for the carrier, or an indication that fast measurement is activated where the UE has a stored association of at least one carrier subject to fast measurement reporting when fast measurement reporting is activated. Such an association may for example be associated in accordance with a geographic area (e.g. based on cell list or location coordinates). The configuration may be for example be received in dedicated radio resource control (RRC) signaling, such as an RRCConnectionRelease message, or through system information (MIB, SIB) broadcast by the gNB. The configuration may be received in any mode such as connected mode (e.g. RRC_CONNECTED state) or idle mode (e.g. RRC_IDLE state), but in any case before the UE initiates a connection setup from idle or inactive mode. While depicted that the UE receives the fast measurement configuration from the same gNB to which it attempts connection setup at 150, one skilled in the art will appreciate that in some embodiments it may be a different gNB.

The configuration for fast measurement reporting may for example indicate that the UE need not perform idle mode measurements on one or more carriers during idle mode regardless of any other configurations the UE may have, while configuring the UE to start performing measurements at a pre-defined time during connection setup and continue those until pre-defined conditions occur (e.g. for a fixed duration, until network indicates UE can stop, or until UE indicates the measurement results to network).

The fast measurement configuration may, either explicitly or implicitly, cause the UE to terminate or inhibit some or all idle and/or inactive mode measurements. For example, the UE may be instructed to terminate or inhibit EMR or other idle/inactive mode measurements on a carrier configured by a gNB in during connection release prior to receiving the fast measurement configuration for the same carrier in system information from another gNB.

At 120, while in idle mode, the UE may perform idle mode measurements, for example for the purpose of cell re-reselection, in which it may measure e.g. a number of synchronization signal blocks (SSBs) or other reference signals (e.g. CSI-RS) from one or more cells associated with one or more gNBs. In one other example, a UE may not be required to measure the configured carriers even if instructions to measure them are broadcasted to the UE in a system information message (MIB, SIB). This could be indicated to the UE for example in the fast measurement configuration (e.g. by a bit-indication) or the SIB could broadcast whether the carrier is applicable for idle/inactive mode measurements if configured for fast measurement.

At 131 and/or 132, a connection setup is triggered at the UE. Such a trigger may be originated in the UE itself at 132 or it may be originated at 131 from a gNB, for example in the form of a paging message or a connection setup request (e.g. RRCSetupRequest).

At 140, in response to the connection setup trigger, the UE initiates measurements on the at least one carrier configured for fast measurement reporting. Some or all other configured measurements may be inhibited while fast measurements are ongoing.

At 150, also in response to the connection setup trigger, the UE initiates connection setup with the gNB. The connection setup proceeds while the UE performs the fast measurements.

In one other example, UE is indicated during RRC connection setup to initiate fast measurements in parallel with RRC connection setup on e.g. primary cell (PCell). The connection setup proceeds while the UE performs the fast measurements.

Once the connection setup is complete, the UE can at 160 indicate fast measurement reporting information to the gNB, which may indicate that the UE has fast measurement results ready for reporting, and/or that it is (still) performing measurements for fast measurement reporting, which may comprise an indication of an estimated time till completion or an indication of a progress metric, and/or it may directly provide part or all of the fast measurement results. The information may for example indicate that for a first carrier measurements are complete, which may include part or all of the measurement results for the first carrier, while the information may further indicate that the measurements for a second carrier are not yet completed. Alternatively, or in addition, the fast measurement information may indicate which carriers the UE has a fast measurement configuration for.

The fast measurement information could be included in a message indicating that the connection setup is complete (e.g. RRCSetupComplete) or in any later message, either initiated by the UE or in response to a query from the gNB. Unless the fast measurements are completed, fast measurements may continue after the fast measurement reporting information is sent to the gNB.

Should the gNB configure the UE with new measurement configurations while the UE is still performing fast measurements, then the UE may either take the new measurement configurations immediately into use while also continuing the fast measurements, or it may postpone taking the new measurement configurations into use until the fast measurements are completed or terminated.

In another example, UE will take the new measurement configuration into use immediately while additionally continuing fast measurements even after connection setup.

Figure 2:
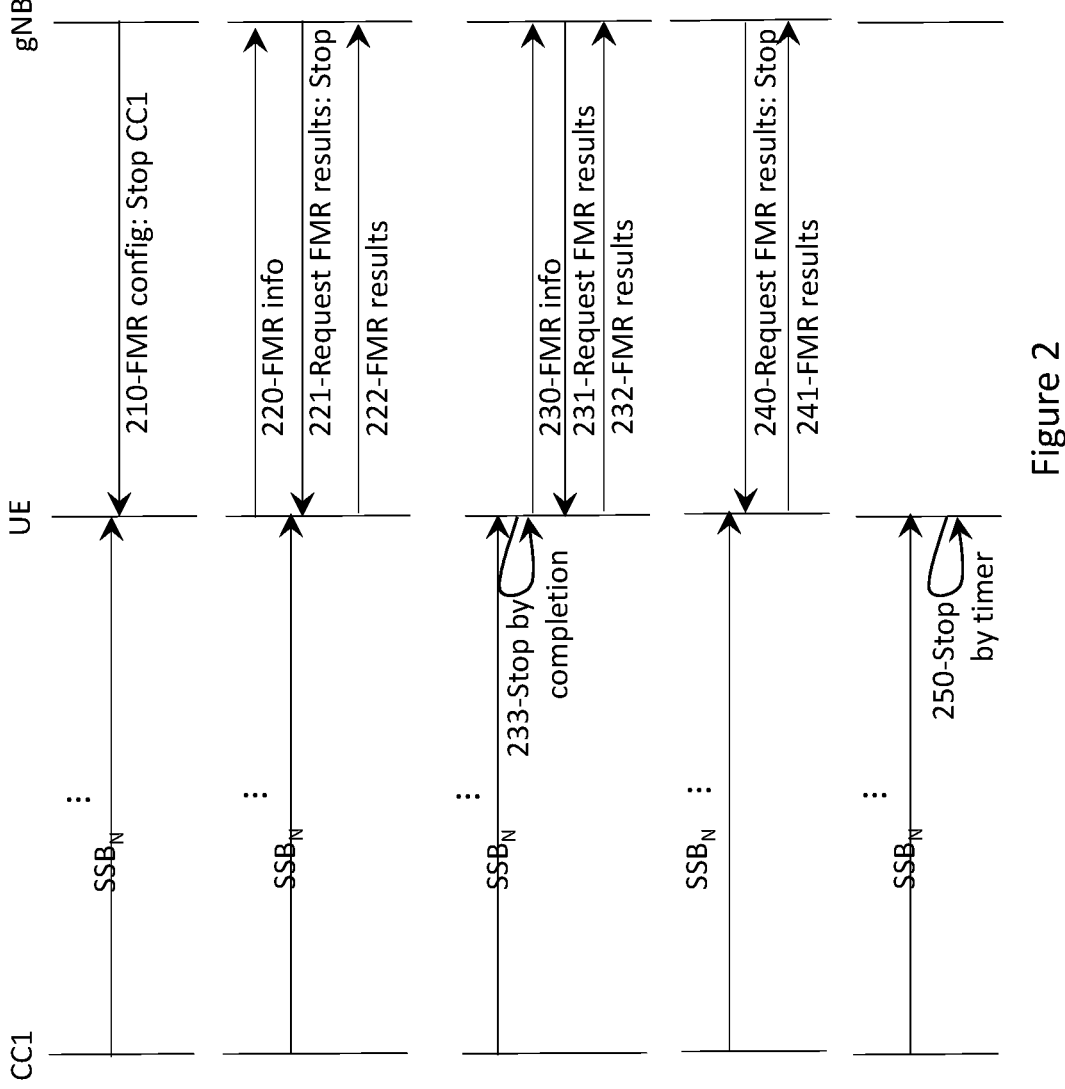
FIG. 2 illustrates a further example signal flow of fast measurement execution and termination in accordance with embodiments of the invention.

While the fast measurements are not completed or terminated, the UE continues such measurements. FIG. 2. shows several embodiments of completion or termination of fast measurements.

In one embodiment at 210, the UE may receive an indication to stop fast measurements, either all or on one or more specific carriers. Such an indication may be separate from a measurement configuration for such specific carriers, such that the UE may retain a measurement configuration for a carrier, while it's designation as fast measurement carrier is removed. Such an indication may be received at any protocol layer, for example in a downlink control indication (DCI), a medium access control message or an RRC message such as an RRC reconfiguration message. Alternative, an indication to stop fast measurements may be implicitly indication by the reception of a radio resource management (RRM) measurement configuration.

In another embodiment, UE may continue fast measurements and reports when completed. In another example, UE may receive RRM measurement configurations which may or may not include same carriers as configured for fast measurements. In one embodiment the UE may inhibit some RRM measurements while fast measurement is ongoing.

In another embodiment at 221, a request for fast measurement results including an indication to stop fast measurements at all or on one or more specific carriers may be received in response to fast measurement information 220 sent by the UE. Such an indication may for example be received for a carrier indicated in the fast measurement information to not be completely measured. In response, the UE provides at 222 the requested measurement results and stops fast measurement on any carriers indicated so.

In an alternative embodiment at 230, the UE may send fast measurement information 230 to indicate that fast measurements are complete or stopped on all carriers configured for fast measurement. The UE in some instances may consider measurements complete after obtaining one or more measurements of one or more measurement quantities (e.g. reference signals received power (RSRP) and/or reference signal received quality (RSRQ)), composed of one or more measurement samples. The UE may in this case at 233 stop all such measurements by virtue of completion such that a request for fast measurement results need not include an indication to stop fast measurements. In response to the request, the UE may at 232 provide the requested measurement results. Fast measurement information 230 may for example also be sent in response to receiving an indication 210 to stop fast measurements.

In an alternative embodiment at 240, a UE may receive a request for fast measurement results comprising an indication to stop fast measurements either on all or on one or more specific carriers without having sent fast measurement information. In response, the UE provides at 222 the requested measurement results and stops fast measurement on any carriers indicated so. A gNB may sent a request for fast measurement results to a UE without having received fast measurement information from a UE per se, or in response of having received fast measurement information for the UE from another gNB. In a different, not depicted embodiment, Request 240 not containing an indication to stop fast measurement may be received after an indication 210 to stop fast measurements has been received. This allows the indication 210 to be received on a different protocol layer (e.g. in a DCI) than the request for results 240 (e.g. in an RRC message).

In yet another embodiment depicted at 250, termination of the fast measurement may be stopped by expiration or stoppage of a timer, initiated for example when fast measurements are initiated at 140 or initiated when fast measurements for a specific carrier are initiated or initiated when connection setup is considered complete (e.g. when RRC-SetupComplete is sent). Such a timer may be combined with any of the above embodiments, such that the timer is for example stopped on reception of 210, 221 or 240.

In yet another embodiment, termination of the fast measurement may be stopped by triggering of a measurement report transmission at the UE, triggering reporting the available fast measurements to the network.

In a further not depicted embodiment, fast measurement may be stopped when a connection release indication is received from a gNB. In some embodiments, the UE may discard the fast measurement configuration when the fast measurement is stopped, while in other embodiments it may remained stored for usage when subsequent connection setups are triggered.

Figure 3:
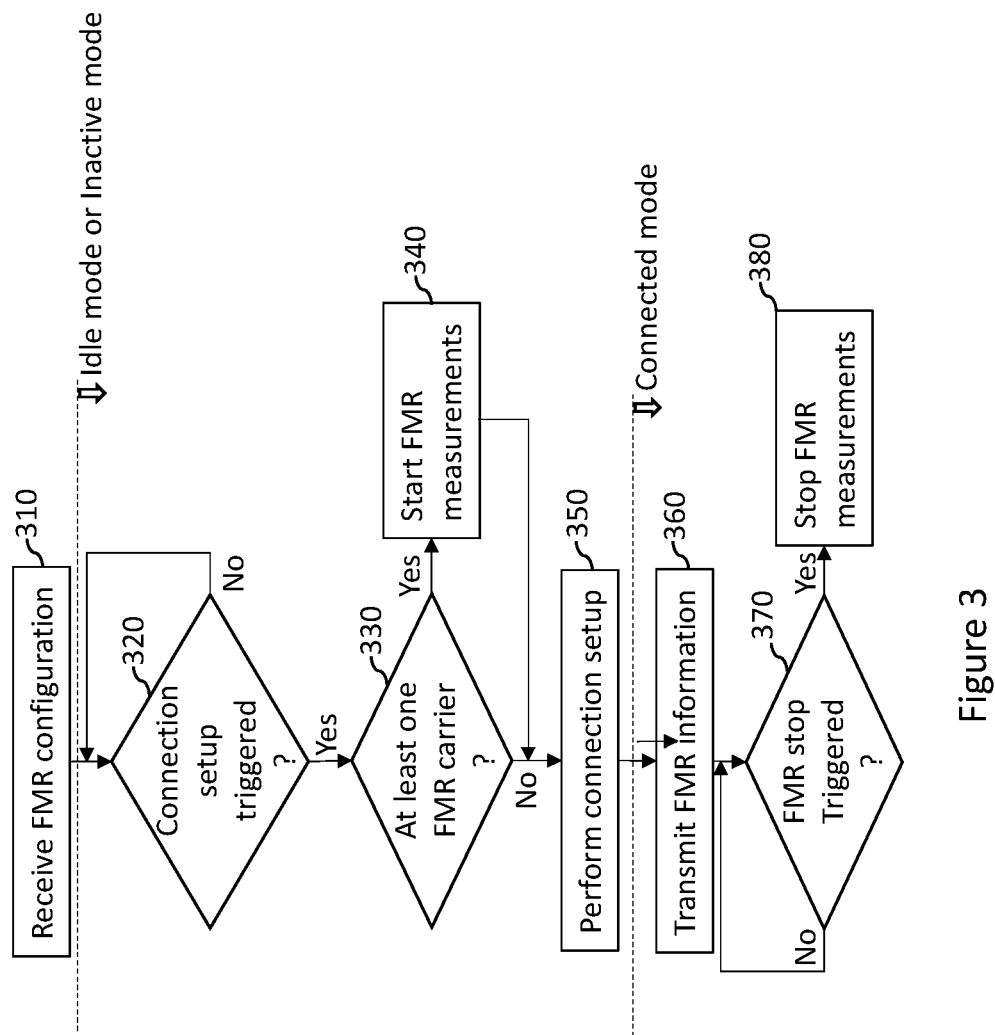
FIG. 3 illustrates a flow diagram in accordance with embodiments of the invention.

FIG. 3 depicts a process flow in accordance with embodiments of the present invention. At 310, a UE receives a fast measurement configuration. The fast measurement configuration may configure at least one carrier for fast measurements and/or it may deconfigure at least one carrier for fast measurement.

At 320, while in idle mode, the UE determines the occurrence of a connection setup trigger. A connection setup trigger may originate from the UE itself, for example if data becomes available for transmission or if the UE transmits a connection setup request or if the UE transmits a connection resume request. Alternatively, the connection setup trigger may originate from the network by reception of a message at the UE potentially triggering a connection setup such as a paging message or by the UE receiving a connection setup from the network.

At 330, in response to determining that a connection setup trigger has occurred, the UE checks whether at least one fast measurement carrier is configured and if so, initiates at 340 fast measurements on the at least one fast measurement carrier.

At 350, the UE performs connection setup to a gNB and transitions to connected mode.

At 360, the UE may transmit fast measurement information to the gNB, indicating that it has fast measurement results available and/or that fast measurements are ongoing and/or information on carriers configured for fast measurement.

At 370, when stoppage of fast measurements is triggered, for example according to any of the processes described with reference to FIG. 2, the UE stops fast measurements.

One skilled in the art will appreciate that fast measurements described supra as being triggered by connection setup when in idle mode, may in other embodiments be similarly triggered by connection setup or resumption while in an inactive mode.

Figure 4:
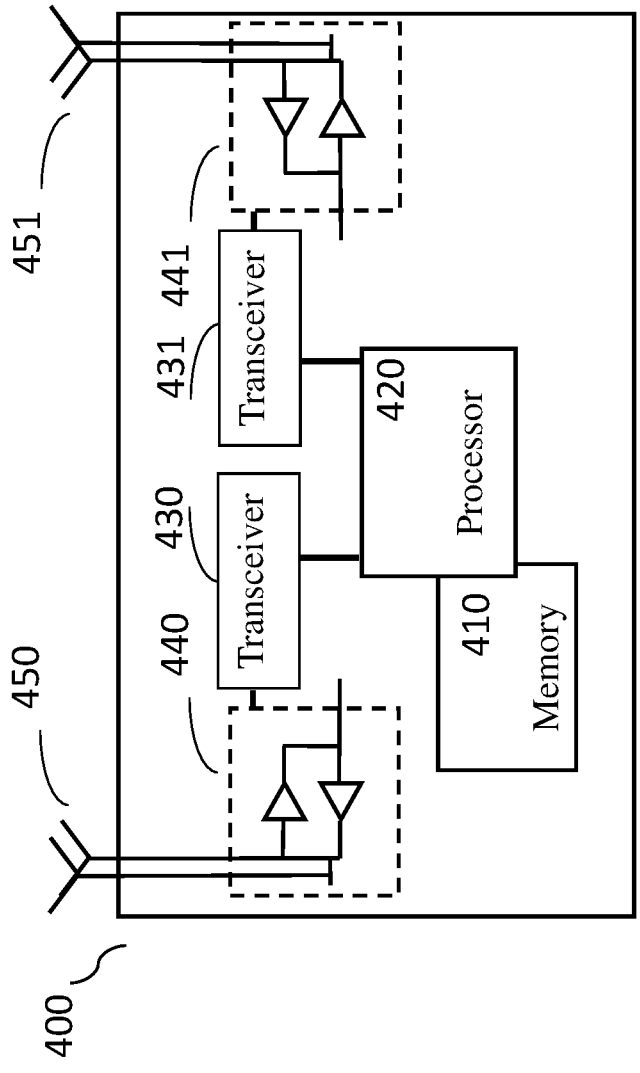
FIG. 4 illustrates an example wireless apparatus in accordance with embodiments of the invention.

FIG. 4 depicts a block diagram illustrating an example wireless apparatus (400) in accordance with embodiments of the invention. The wireless apparatus may include at least one processor (420), at least one memory (410) coupled to the at least one processor (420) and at least one suitable transceiver (430, 431) having a transmitter and a receiver coupled to the at least one processor (420), coupled to at least one antenna unit (450, 451) through at least one amplifier (440, 441). The at least one memory (410) may store computer programs, which may, when executed by the at least one processor (420), for example in combination with any of the at least one transceiver (430, 431), at least one amplifier (440, 441) and at least one antenna unit (450, 451), perform embodiments of the invention. For example, a user equipment, such as a mobile phone, car, watch or drone may be embodied in apparatus 400. In certain embodiments, apparatus 400 may perform connection setup through transceiver 430, one or more amplifier 440 and one or more antennas 450 in FR1 (frequency bands in the range 410 MHz-7125 MHz) while performing fast measurements through transceiver 431, one or more amplifier 441 and one or more antennas 451 in FR2.

Embodiments of the invention may be implemented in software (executed by one or more processors), hardware (e.g., an application specific integrated circuit or field programmable gate array), or a combination of software and hardware. In an example embodiment, the software (e.g., application logic, an instruction set) is maintained on any one of various conventional non-transitory computer-readable media.

Although various aspects are set out above, other aspects comprise other combinations of features from the described embodiments, and not solely the combinations described above.

The invention claimed is:

1. An apparatus, comprising:

at least one processor; and at least one memory including computer program code the at least one memory and the computer program code configured to, with the at least one processor, cause the apparatus to perform at least the following:

receive a configuration for fast measurement reporting;

determine, while in an idle or inactive mode, an occurrence of a connection setup trigger;

while in the idle or inactive mode, refrain from performing idle or inactive mode measurements on at least one carrier configured as an at least one fast measurement reporting carrier even if system information includes instructions to perform idle or inactive mode measurements on the at least one carrier;

when at least one fast measurement reporting carrier is configured, start measurements on the at least one fast measurement reporting carrier in response to the determination of the occurrence of the connection setup trigger;

perform a connection setup and while in connected mode, transmit a message comprising fast measurement information, wherein the fast measurement information indicates that fast measurement is ongoing for at least one fast measurement carrier;

receive, after transmitting the fast measurement information, a request for fast measurement results, wherein the request comprises an indication to stop fast measurements;

in response to receiving the request, transmit the requested fast measurement results and stop fast measurements, wherein a fast measurement timer is stopped in response to receiving the request;

inhibit, based on the configuration for fast measurement reporting, while in idle or inactive mode, configured idle or inactive mode measurements for early measurement reporting;

initiate the fast measurement timer substantially when connection setup is triggered and fast measurements are started, or initiating the fast measurement timer substantially when connection setup is completed; and terminate fast measurements when the fast measurement timer expires or when fast measurements are stopped in response to the request, wherein the configuration for fast measurement reporting indicates configuration of the at least one fast measurement reporting carrier, wherein the configured idle or inactive mode measurements for early measurement reporting are inhibited on carriers configured as fast measurement reporting carrier, wherein the configuration for fast measurement reporting is received in a system information broadcast message or a connection release message, wherein any other configured measurements are inhibited from the starting of the fast measurement until fast measurements are stopped, wherein the at least one carrier configured for fast measurement is determined based on geographic area, wherein the fast measurement information comprises (i) an estimated time to completion and (ii) a progress metric, wherein the fast measurement information indicates that measurements are complete for a first carrier and not complete for a second carrier, and comprises at least a portion of measurement results for the first carrier, wherein the configuration for fast measurement reporting comprises (a) an indication of a carrier for which the apparatus has a stored measurement configuration, or (b) an indication that fast measurement is activated, wherein the apparatus has a stored association of at least one carrier subject to fast measurement reporting when fast measurement is activated, and wherein the connection setup is performed using a first transceiver on a first frequency range and wherein fast measurements are performed using a second transceiver on a second frequency range while the connection setup is being performed.

\* \* \* \* \*